US008367770B2

(12) United States Patent
Ha et al.

(10) Patent No.: US 8,367,770 B2
(45) Date of Patent: Feb. 5, 2013

(54) ACRYLATE-VINYL AROMATIC-UNSATURATED NITRILE GRAFT COPOLYMER WITH EXCELLENT IMPACT STRENGTH, COLORABILITY, AND WEATHERABILITY, AND THERMOPLASTIC RESIN COMPOSITION CONTAINING THE SAME

(75) Inventors: Doo Han Ha, Yeosu-si (KR); Jun Hwan An, Yeosu-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 11/759,272

(22) Filed: Jun. 7, 2007

(65) Prior Publication Data

US 2007/0287799 A1 Dec. 13, 2007

(30) Foreign Application Priority Data

Jun. 8, 2006 (KR) ........................ 10-2006-0051425

(51) Int. Cl.
*C08L 51/04* (2006.01)
(52) U.S. Cl. ......................................................... 525/85
(58) Field of Classification Search .................... 525/71, 525/85
See application file for complete search history.

(56) References Cited

U.S. PATENT DOCUMENTS

| | | | |
|---|---|---|---|
| 3,426,101 A | 2/1969 | Ryan et al. | |
| 4,108,946 A * | 8/1978 | Kamada et al. | 525/310 |
| 4,528,330 A | 7/1985 | Kishida et al. | |
| 5,132,371 A | 7/1992 | Sasaki et al. | |
| 5,777,036 A * | 7/1998 | Fischer et al. | 525/285 |
| 6,187,862 B1 | 2/2001 | Chang et al. | |
| 6,531,543 B1 | 3/2003 | Guntherberg et al. | |
| 7,393,891 B2 | 7/2008 | O et al. | |
| 2003/0153710 A1 | 8/2003 | Shin et al. | |
| 2005/0203247 A1* | 9/2005 | Ahn et al. | 524/804 |

FOREIGN PATENT DOCUMENTS

| | | |
|---|---|---|
| DE | 1260135 | 2/1968 |
| EP | 0465792 A2 | 1/1992 |
| GB | 1124911 A | 6/2007 |
| JP | 4-180949 | 6/1992 |
| JP | 5-202264 | 8/1993 |
| JP | 7-316243 | 12/1995 |
| JP | 11-502540 | 3/1999 |
| JP | 2004-521995 | 7/2004 |
| JP | 2006-509101 A | 3/2006 |
| KR | 10-2003-0038366 A | 5/2003 |
| KR | 10-0440474 A | 9/2003 |
| KR | 10-0477944 A | 11/2004 |
| KR | 10-2005-0071873 A | 7/2005 |
| WO | 96/23839 A1 | 8/1996 |
| WO | 2007/142473 A1 | 12/2007 |

OTHER PUBLICATIONS

Park, electronic translation of Kr 10-2004-0000259, Jan. 2004.*
International Search Report in counterpart International Application No. PCT/KR2007/002754, dated Aug. 29, 2007.
International Preliminary Report on Patentability in counterpart International Application No. PCT/KR2007/002754 dated Dec. 10, 2008.
Supplementary European Search Report in counterpart European Application No. 07793112 dated Jul. 6, 2010.
Office Action in counterpart European Application No. 07793112 dated Jul. 16, 2010.
Japanese Office Action in counterpart Japanese Application No. 2009-514204 dated Dec. 27, 2011, pp. 1-3.

* cited by examiner

*Primary Examiner* — Jeffrey Mullis
(74) *Attorney, Agent, or Firm* — Summa, Additon & Ashe, P.A.

(57) ABSTRACT

One aspect of the invention relates to an acrylate-vinyl aromatic-unsaturated nitrile graft copolymer. The acrylate-vinyl aromatic-unsaturated nitrile graft copolymer can include: a double layered rubbery polymer comprising an inner core layer of alkylacrylate-vinyl aromatic copolymer and an outer core layer of alkylacrylate polymer; and a vinyl aromatic-unsaturated nitrile copolymer shell layer grafted onto the double layered rubbery polymer. Another aspect of the invention relates to a weatherable thermoplastic resin composition including the foregoing acrylate-vinyl aromatic-unsaturated nitrile graft copolymer.

8 Claims, No Drawings

ACRYLATE-VINYL AROMATIC-UNSATURATED NITRILE GRAFT COPOLYMER WITH EXCELLENT IMPACT STRENGTH, COLORABILITY, AND WEATHERABILITY, AND THERMOPLASTIC RESIN COMPOSITION CONTAINING THE SAME

CROSS REFERENCE TO RELATED APPLICATION

This non-provisional application claims priority from Korean Patent Application No. 10-2006-51425, filed Jun. 8, 2006, which is hereby incorporated by reference in its entirety.

FIELD OF THE INVENTION

The present invention relates to an acrylate-vinyl aromatic-unsaturated nitrile graft copolymer. More particularly, the present invention relates to an acrylate-vinyl aromatic-unsaturated nitrile graft copolymer that can have superior weatherability and colorability as well as good impact strength even at low temperatures and a thermoplastic resin composition containing the same.

BACKGROUND OF THE INVENTION

Acrylonitrile-butadiene-styrene graft copolymer resins (hereinafter, ABS resins) generally can have good impact resistance, processability, mechanical strength, heat distortion temperature and colorability. Therefore, ABS resins have been widely used in the production of electric or electronic goods, automobile parts, office automation (OA) instruments, and the like.

However, ABS resins can have poor weatherability, because of the many chemically unstable double bonds in the butadiene rubber component. Accordingly, ABS resins can readily deteriorate upon exposure to ultraviolet rays. For this reason, weather stabilizers are commonly added to ABS resins during extrusion processes. Even with the addition of weather stabilizers, however, the resulting molded article may still not exhibit sufficient weatherability because of the butadiene rubber component.

In an attempt to address this problem, a chemically stable acryl rubber or a rubbery polymer of butadiene and acrylic monomer can be used instead of the butadiene rubber.

Acrylate-styrene-acrylonitrile graft copolymers (hereinafter, ASA resin) prepared by graft copolymerizing acrylic rubber, styrene and acrylonitrile monomer have been widely used in the production of various products such as automobiles, agricultural devices, and electric or electronic goods, which are used outdoors and which require weatherability.

Because the ASA resin does not have chemically unstable double bonds, it may have good weatherability. However, the ASA resin can exhibit inferior impact resistance.

To address this concern, methods for imparting impact resistance to ASA resin have been proposed, which can employ rubber components having large-sized particles or which can lower the gel content of the rubbery polymer. However, these methods can have drawbacks, such as difficulty in controlling the physical properties of a graft copolymer and poor surface gloss. Further, methods using acrylic rubber lattices having different particle sizes could not overcome the above problems.

As noted herein, ASA resins are terpolymers of acrylate-styrene-acrylonitrile and can have good weatherability, as well as chemical resistance and heat stability. Accordingly, as also noted here in, ASA resins have been used in various outdoor applications which take advantage of the weatherability of such resins. Examples of such products can include outdoor electric or electronic parts, automobile parts, building materials, agricultural implements, ASA/ABS sheets, profile extrusions, sign posts, outdoor products, sports products, interior articles, leisure products, home appliances, sports products, and the like, and further including satellite antenna, kayak paddles, sash joiners, door panels and sideview mirror housings. However, the relatively poor colorability and insufficient impact resistance at room temperature and at low temperature make these ASA resins less favored for more demanding applications. Accordingly, there remains a need for improved weatherable ASA resins which maintain desirable properties regardless of temperature and have good colorability.

U.S. Pat. No. 3,426,101, Japanese Patent Publication Laid-Open Nos. 4-180949, 5-202264 and 7-316243 and German Patent Publication No. 1260135 are directed to methods for preparing weatherable ASA resins. These patents employ butadiene rubber as a core and a rubber copolymer comprising alkylacrylate rubber as a shell. However, these methods are considered disadvantageous, because the polymerization is complicated and it can be difficult to control the reaction. Further, the butadiene rubber in the core may cause a decrease in weatherability under bad weather conditions. Moreover the ASA resins show poor colorability.

Korean Patent No. 10-0440474 is directed to an ASA-based thermoplastic resin composition having good low temperature impact resistance. The ASA-based thermoplastic resin composition comprises two kinds of alkylacrylate rubber latex cores having different sizes and a SAN copolymer grafted into the rubber latex. However, the resulting molded article does not exhibit sufficient colorability and the method for preparing the above ASA-based thermoplastic resin can be expensive because the method separately prepares two acrylate latex cores.

Korean Patent No. 10-0477944 is directed to an ASA graft copolymer composition which comprises a rubbery polymer consisting of an inner layer comprising 1,3-butadiene and an outer layer composed of alkyl acrylate monomer and aromatic vinyl compound; an alkyl methacrylate or alkyl acrylate compound; an aromatic vinyl compound; and a vinyl cyanide compound. However, the resulting molded article still exhibits poor colorability.

Further, U.S. Pat. No. 6,187,862 is directed to a grafted rubber comprising a substrate, a first grafted phase and a subsequent grafted phase which are sequentially grafted to the substrate, wherein the substrate contains a core containing the polymerization product of at least one vinylaromatic monomer, and a shell containing a crosslinked elastomer selected from the group consisting of polyalkyl acrylate, hydrogenated polydiene and polydiene. Although the resin composition using the grafted rubber features improved impact strength and weatherability, the low temperature impact strength and colorability are still insufficient.

Accordingly, there still exits a need for an improved ASA graft copolymer exhibiting desirable colorability, weatherability and impact resistance even at low temperatures.

SUMMARY OF THE INVENTION

The present invention can provide an acrylate-vinyl aromatic-unsaturated nitrile graft copolymer, which can have good weatherability and colorability and high impact resistance at room temperature as well as at low temperatures and further can have a novel core structure and specific composition. The present invention can further provide a thermoplastic resin composition having good weatherability and colorability and high impact resistance at room temperature as well as at low temperatures which includes the foregoing acrylate-vinyl aromatic-unsaturated nitrile graft copolymer. Still further, the present invention can provide a novel method of preparing an acrylate-vinyl aromatic-unsaturated nitrile graft copolymer.

The acrylate-vinyl aromatic-unsaturated nitrile graft copolymer of the invention can include: a double layered rubbery polymer including an inner core layer including an alkylacrylate-vinyl aromatic copolymer and an outer core layer including an alkylacrylate polymer; and a vinyl aromatic-unsaturated nitrile copolymer shell layer grafted onto the double layered rubbery polymer.

In exemplary embodiments of the invention, the rubbery polymer may have an average particle size of about 0.1 to about 0.3 μm, a gel content of about 85 to about 98% and a swell index of about 10 to about 25.

In exemplary embodiments of the invention, the inner core layer can include a copolymer including about 20 to about 80% by weight of an alkylacrylate compound and about 80 to about 20% by weight of a vinyl aromatic compound.

In exemplary embodiments of the invention, the double layered rubbery polymer can include about 10 to about 50% by weight of the inner core layer and about 90 to about 50% by weight of the outer core layer.

In exemplary embodiments of the invention, the acrylate-vinyl aromatic-unsaturated nitrile graft copolymer can include about 40 to about 70 parts by weight of the double layered rubbery polymer and about 30 to about 60 parts by weight of the shell layer. The shell layer can include a copolymer comprising about 62 to about 80% by weight of a vinyl aromatic compound and about 38 to about 20% by weight of an unsaturated nitrile compound.

Another aspect of the invention can provide a method of preparing the foregoing acrylate-vinyl aromatic-unsaturated nitrile graft copolymer. The method can include polymerizing about 20 to about 80% by weight of an alkylacrylate compound and about 80 to about 20% by weight of a vinyl aromatic compound to obtain an inner core layer; adding about 90 to about 50 parts by weight of an alkylacrylate compound to about 10 to about 50 parts by weight of the inner core layer to obtain a rubbery polymer; and polymerizing about 40 to about 70 parts by weight (based on solid content) of the rubbery polymer and about 60 to about 30 parts by weight of a monomer mixture comprising a vinyl aromatic compound and an unsaturated nitrile compound to form the acrylate-vinyl aromatic-unsaturated nitrile graft copolymer.

In various embodiments, the acrylate-vinyl aromatic-unsaturated nitrile graft copolymer obtained from the above process may be coagulated, dehydrated and dried to form a powder.

Another aspect of the invention relates to a weatherable thermoplastic resin composition having good impact resistance and colorability. The composition may include about 40 to about 70 parts by weight of the acrylate-vinyl aromatic-unsaturated nitrile graft copolymer described above and about 30 to about 60 parts by weight of a vinyl aromatic-unsaturated nitrile copolymer.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

One aspect of the present invention relates to an acrylate-vinyl aromatic-unsaturated nitrile graft copolymer. The acrylate-vinyl aromatic-unsaturated nitrile graft copolymer of the invention can have a novel core structure and a specific composition, so that it may have good weatherability, colorability and high impact resistance at room temperature as well as at very low temperatures.

The acrylate-vinyl aromatic-unsaturated nitrile graft copolymer can include: a double-layered rubbery polymer comprising an inner core layer including an alkylacrylate-vinyl aromatic copolymer and an outer core layer including an alkylacrylate polymer, and a shell layer including a vinyl aromatic-unsaturated nitrile copolymer grafted onto the double-layered rubbery polymer.

Conventional ASA resin compositions can have poor colorability because of the large difference in refractive index between an ASA graft copolymer and a SAN matrix and poor gloss caused by light diffusion. The present invention can increase the refractive index of the inner core layer by including a vinyl aromatic compound in the inner core. This in turn can increase the colorability of the resin composition. Thus, in the invention, the inner core layer can include a copolymer of an alkylacrylate and a vinyl aromatic compound to improve colorability.

The inner core layer can include a copolymer including about 20 to about 80% by weight of an alkylacrylate compound and about 80 to about 20% by weight of a vinyl aromatic compound. For example, the inner core layer can include a copolymer including about 20 to about 50% by weight of an alkylacrylate compound and about 50 to about 80% by weight of a vinyl aromatic compound. If the amount of the vinyl aromatic compound is less than about 20% by weight, the resin composition obtained therefrom may not have the desired colorability. On the other hand, if the amount of the vinyl aromatic compound is more than about 80% by weight, the glass transition temperature can rapidly increase, so that the resin composition may have poor impact resistance at low temperatures.

When a vinyl aromatic monomer is used as a core material, the glass transition temperature may increase, which can result in poor impact strength at low temperatures. In exemplary embodiments of the invention, the vinyl aromatic component of the inner core can be covered with the outer core, to thereby prevent increases in the glass transition temperature and to improve refractive index, colorability and low temperature impact resistance. The outer core layer can be prepared by polymerizing an alkylacrylate, a grafting agent and a cross-linking agent uniformly onto the surface of inner core so that the outer core layer may envelope or cover the inner core.

In exemplary embodiments of the invention, the outer core layer can include an alkylacrylate polymer. If a vinyl aromatic compound is present in the outer core layer, the glass transition temperature may rapidly increase, so that it may be difficult to obtain a good physical balance of colorability and impact resistance at room temperature and at low temperatures.

In exemplary embodiments of the invention, the rubbery polymer can have a multi-layered core structure. For example, the rubbery polymer can have a double-layered core structure. The double-layered rubbery polymer can include an inner core layer and an outer core layer. For example, the double-layered polymer can include the inner core layer in an amount of about 10 to about 50% by weight and the outer core layer in an amount of about 90 to about 50% by weight.

In exemplary embodiments of the invention, the rubbery polymer can have an average particle diameter of about 0.1 to about 0.3 μm. If the average particle diameter of the rubbery polymer is less than about 0.1 μm, the impact modifying effect may be reduced. On the other hand, if the average particle diameter of the rubbery polymer is more than about 0.3 μm, the gloss and colorability of resin articles produced therefrom may decrease. In exemplary embodiments of the invention, the rubbery polymer can have a gel content of about 85 to about 98% and a swell index of about 10 to about 25.

In exemplary embodiments of the invention, the shell layer may be formed by grafting a vinyl aromatic-unsaturated nitrile copolymer onto the double layered rubbery polymer. Because the vinyl aromatic-unsaturated nitrile copolymer forms a shell layer, the acrylate-vinyl aromatic-unsaturated nitrile graft copolymer obtained therefrom may have high impact resistance at room temperature and at low temperatures as well as high colorability.

Exemplary graft monomers useful for the shell layer may include vinyl aromatic compounds and unsaturated nitrile compounds. For example, the monomers grafted onto the double-layered rubbery core polymer can include about 62 to about 80% by weight of a vinyl aromatic compound and about 38 to about 20% by weight of an unsaturated nitrile compound. If the amount of the vinyl aromatic compound is more than about 80% by weight, weatherability may be degraded due to a photo oxidation mechanism and it can be difficult to obtain sufficient colorability. If the amount of the vinyl aromatic compound is less than about 62% by weight, unsaturated nitrile monomers can rapidly react and reaction stability can decrease, thereby resulting in the formation of large amounts of macro-agglomerates or coagulum. Further, a molded article produced using a resin composition obtained therefrom could also exhibit deteriorated colorability and melt flow index.

In exemplary embodiments of the invention, the graft ratio of the graft copolymer in the shell layer can be about 30 to about 70%, for example about 35 to about 65%. If the graft ratio is lower than about 30%, the surface of the rubbery polymer can become excessively exposed, which can deteriorate the gloss and appearance of a molded article obtained therefrom. On the other hand, if the graft ratio exceeds about 70%, SAN resin can be excessively grafted onto the surface of the rubbery polymer, which can deteriorate impact strength and melt flow index.

In exemplary embodiments of the invention, the acrylate-vinyl aromatic-unsaturated nitrile graft copolymer can include about 40 to about 70 parts by weight of the double-layered rubbery polymer and about 30 to about 60 parts by weight of the shell layer. If the amount of the rubbery polymer is less than about 40 parts by weight, the amount of graft monomers can relatively increase, which can require a longer polymerization reaction time and thus lower productivity. Further undesirable coagulum can be abundantly produced in the reactor. On the other hand, if the amount of rubbery polymer exceeds about 70 parts by weight, the amount of graft monomers can relatively decrease, so that it can be difficult to increase the graft ratio sufficiently and the graft reactions on the surface of the rubbery polymer may not progress uniformly. Moreover, it can be difficult to obtain the graft polymer in the form of fine powder, because the graft polymer particles can stick to each other during coagulation and drying processes, which can deteriorate the glossy appearance of the final article.

Another aspect of the invention provides a method of preparing the foregoing acrylate-vinyl aromatic-unsaturated nitrile graft copolymer. The method can include polymerizing an alkylacrylate compound and a vinyl aromatic compound to prepare an inner core layer, reacting the inner core layer with an alkylacrylate compound to form a rubbery polymer having a double-layered core structure, and polymerizing the rubbery polymer and a monomer mixture including a vinyl aromatic compound and an unsaturated nitrile compound to form an acrylate-vinyl aromatic-unsaturated nitrile graft copolymer. Exemplary methods in accordance with this aspect of the invention are set forth in more detail below.

Step 1: Preparation of a Rubbery Polymer having a Double Layered Core Structure

In accordance with one embodiment of the invention, about 20 to about 80% by weight of an alkylacrylate monomer and about 80 to about 20% by weight of a vinyl aromatic monomer are mixed. To the monomer mixture are added a cross-linking agent and a grafting agent. The amount of the monomer mixture can be about 10 to about 50 parts by weight and the amount of the cross-linking agent and grafting agent can be about 0.1 to about 1.5 parts by weight. An emulsifier, electrolyte and ion-exchanged water are then added to the mixture, and the mixture is heated with stirring to disperse the monomers, grafting agent and cross-linking agent sufficiently to thereby form an inner core. When the temperature reaches about 50 to about 65° C., the mixture is further stirred for about 5 to about 20 minutes while maintaining the temperature to stabilize the reaction system. Next, a water-soluble initiator is added to the mixture to initiate a polymerization reaction.

As the polymerization reaction is initiated, the temperature of reaction system is raised. The internal temperature is maintained at about 65 to about 75° C. by using a cooler. The polymerization reaction is continued for about 10 to about 20 minutes to form an inner core.

The outer core layer may then be formed onto the latex of the inner core. Separately, an alkylacrylate monomer, a cross-linking agent, an emulsifier and ion-exchanged water are mixed and stirred to obtain a pre-emulsion. The amount of the alkylacrylate monomer is about 90 to about 50 parts by weight and the amount of the cross-linking agent is about 0.5 to about 2 parts by weight. The pre-emulsion is added to the inner core latex continuously over a period of about 1 hour to about 5 hours to conduct uniform graft polymerization reaction onto the inner core. After the addition of the pre-emulsion is completed, the polymerization reaction is continued further for about 30 minutes to about 150 minutes. The conversion rate may be more than about 97%. The alkylacrylate-vinyl aromatic copolymer latex has a double core layered structure.

Step 2: Preparation of Acrylate-Vinyl Aromatic-Unsaturated Nitrile Graft Copolymer An emulsifier, ion-exchanged water, and the like are added to about 40 to about 70 parts by weight (based on solid content) of the alkylacrylate-vinyl aromatic copolymer latex obtained from step 1. The temperature is raised to about 50 to about 60° C. with stirring. When the internal temperature reaches about 50 to about 65° C., water-soluble initiator is added thereto. Then, a mixture of graft monomers and molecular weight controlling agent are added to the reactor continuously over a period of about 1 to about 5 hours to conduct the polymerization reaction. The graft monomers include vinyl aromatic monomer and unsaturated nitrile monomer. In exemplary embodiments of the invention, the graft monomers can include about 62 to about 80% by weight of a vinyl aromatic monomer and about 38 to about 20% by weight of an unsaturated nitrile monomer. In exemplary embodiments of the invention, about 60 to about 30 parts by weight of the graft monomers are added thereto. The graft monomers and the initiator participate in the graft reaction at a uniform rate so that the grafted monomers substantially uniformly form a shell layer on the surface of the rubbery polymer. Therefore the graft copolymer latex may have a core-shell structure.

The graft copolymerization reaction temperature may be about 55 to about 90° C., for example, about 60 to about 80° C. After completion of the addition, the polymerization reaction is continued further for about 20 to about 120 minutes while maintaining the temperature of about 70 to about 80° C. When the conversion rate reaches more than about 96%, the polymerization reaction may be terminated by cooling to obtain an acrylate-vinyl aromatic-unsaturated nitrile graft copolymer latex having graft ratio of about 30 to about 70% and a solid content of about 39 to about 45 parts by weight.

The acrylate-vinyl aromatic-unsaturated nitrile graft copolymer prepared from the above may be further coagulated, dehydrated and dried to form a powder.

The alkylacrylate monomer can include a $C_{2-8}$ alkyl(meth)acrylate. Examples of suitable alkylacrylate monomers can include, but are not limited to, methyl acrylate, ethyl acrylate, propyl acrylate, isopropyl acrylate, t-butyl acrylate, n-butyl acrylate, n-octyl acrylate, 2-ethylhexyl acrylate; methyl methacrylate, ethyl methacrylate, propyl methacrylate, isopropyl methacrylate, t-butyl methacrylate, n-butyl methacrylate, n-octyl methacrylate, 2-ethylhexyl methacrylate; and the like, and mixtures thereof. n-Butyl acrylate, n-butyl methacrylate and mixtures thereof can be advantageous in various embodiments.

Examples of suitable vinyl aromatic monomers can include, but are not limited to, styrene, α-ethylstyrene, α-methylstyrene; p-methylstyrene, o-t-butylstyrene; bromostyrene, chlorostyrene, trichlorostyrene, and the like, and mixtures thereof.

In exemplary embodiments of the invention, the polymerization initiator can be a water-soluble initiator. The water-soluble initiator can induce graft monomers to react both in the rubbery polymer and in the shell layer effectively, so that the graft copolymer obtained therefrom may have good low temperature impact resistance, colorability, melt flow index and good appearance.

Conventional water-soluble initiators such as potassium persulfate, sodium persulfate, ammonium persulfate, silver persulfate, and the like, and mixtures thereof can be used. The water-soluble initiator can be used in an amount of about 0.2 to about 1 parts by weight in each polymerization step. If the amount is outside the above-range, it may be difficult to prepare the desired graft copolymer of the present invention. For example, if the amount is less than the above-range, the graft copolymer obtained therefrom may have a low graft ratio and polymerization rate, so that unreacted monomers increase, and excessive ungrafted polymers are formed. If the amount is more than the above-range, the reaction rate can increase so that the reaction system can be unstable and the amount of the coagulum also increases, which can result in poor colorability of a molded article.

Exemplary cross-linking agents and grafting agents can include without limitation allyl methacrylate, triallyl isocyanurate, triallyl amine, allyl maleate, diallyl fumarate, diallyl amine, divinylbenzene, trivinylbenzene, ethylene glycol di(meth)acrylate, diethylene glycol di(meth)acrylate, triethylene glycol di(meth)acrylate, 1,3-butanediol di(meth)acrylate, 1,6-hexanediol di(meth)acrylate, neopentyl glycol di(meth)acrylate, trimethylolpropane tri(meth)acrylate, trimethylolmethane tri(meth)acrylate, and the like, and mixtures thereof. The amount of the cross-linking agent and the grafting agent can be about 0.05 to about 2.5 parts by weight. If the amount is less than about 0.05 parts by weight, it may be difficult to increase gel content and graft ratio, which can deteriorate impact resistance and gloss. If the amount is more than about 2.5 parts by weight, gel content and graft ratio may increase excessively.

Any conventional emulsifier can be used. Examples of suitable emulsifiers can include without limitation metal salts of rosinate, such as potassium rosinate, sodium rosinate, and the like; metal salt derivatives of an aliphatic acid, such as sodium laurylate, sodium oleate, potassium oleate, potassium stearate, and the like; sodium laurylsulfate, and the like, and mixtures thereof. Potassium stearate, potassium rosinate or a mixture thereof can be advantageous. The amount of the emulsifier may be about 1 to about 5 parts by weight for preparing the rubbery polymer, and about 0.3 to about 1.8 parts by weight for preparing the graft copolymer. If the amount of the emulsifier is less than the above-range, a large amount of undesirable coagulum may be produced in the grafted latex. On the other hand, if the amount of the emulsifier exceeds the above-range, natural color and weatherability of the final product can deteriorate due to gas formation during injection molding processes.

Another aspect of the invention relates to a weatherable thermoplastic resin composition. The resin composition can include the foregoing acrylate-vinyl aromatic-unsaturated nitrile graft copolymer as described herein and a vinyl aromatic-unsaturated nitrile copolymer. The amount of the acrylate-vinyl aromatic-unsaturated nitrile graft copolymer can be about 40 to about 70 parts by weight and the amount of the vinyl aromatic-unsaturated nitrile copolymer can be about 30 to about 60 parts by weight. Other additives may be included in the weatherable thermoplastic resin composition, such as but not limited to oxidation inhibitors, lubricants, light stabilizers, fillers, inorganic additives, pigments and/or dyes, and the like, and mixtures thereof.

Examples of the unsaturated nitrile compound can include, but are not limited to, acrylonitrile, methacrylonitrile, and the like. These unsaturated nitrile compounds may be used alone or in combination with each other.

Examples of the vinyl aromatic compound can include, but are not limited to, styrene, α-methylstyrene, p-t-butylstyrene, 2,4-dimethylstyrene, vinyltoluene, and the like. These vinyl aromatic compounds may be used alone or in combination with each other.

In one embodiment of the invention, copolymerizable monomers, such as N-phenylmaleimide, N-cyclohexyl maleimide, maleic anhydride, and the like, may also be added during the polymerization of the vinyl aromatic-unsaturated nitrile copolymer. The polymerization may be emulsion, suspension, solution, or bulk polymerization.

The vinyl aromatic-unsaturated nitrile copolymer can include about 23 to about 45% by weight of an unsaturated nitrile compound and about 77 to about 55% by weight of a vinyl aromatic compound. If the amount of the unsaturated nitrile compound is less than about 23% by weight, weatherability may be degraded due to a photo oxidation mechanism and it can be difficult to obtain sufficient colorability. If the amount of the unsaturated nitrile compound is more than about 45% by weight, the molded article of the resin composition can have deteriorated color and melt flow index.

The resin composition according to the present invention can be prepared using conventional methods. For example, all the components and additives can be mixed together and extruded through an extruder and can be prepared in the form of pellets.

The resin composition according to the present invention can be useful in the production of various articles. In exemplary embodiments of the invention, the resin composition can be formed into outdoor electric or electronic parts, building materials, interior articles, leisure products, home appliances, sports products, automobile parts, and the like. These examples are merely illustrative and are not limiting.

The invention may be better understood by reference to the following examples which are intended for the purpose of illustration and are not to be construed as in any way limiting the scope of the present invention, which is defined in the claims appended hereto. In the following examples, all parts and percentage are by weight unless otherwise indicated.

EXAMPLES

Example 1

(1) Step 1: Preparation of Rubbery Polymer of Core Layer

In a 200-liter reactor equipped with a stirrer, a cooling apparatus, a condenser and a monomer supplying tube, 5 parts by weight of butylacrylate, 15 parts by weight of styrene, 0.2 parts by weight of triallyl isocyanurate, 140 parts by weight of ion-exchanged water and 1.0 parts by weight of potassium rosinate are added and mixed. The temperature is raised to 60° C. with stirring. After 10 minutes from the time of reaching 60° C., 0.25 parts by weight of potassium persulfate dissolved in deionized water is added thereto to initiate polymerization. The temperature of the reactor is maintained at 70° C. for 60 minutes. The polymerization is carried out at 70° C. for an additional 30 minutes to give an inner core of butylacrylate-styrene copolymer.

A pre-emulsion containing 80 parts by weight of butylacrylate, 1.2 parts by weight of triallyl isocyanurate and 3.5 parts by weight of potassium rosinate are then added to the reactor continuously over a period of 3 hours to conduct the polymerization reaction. After completion of the addition, the polymerization reaction is continued for an additional 120 minutes. The reaction mixture is cooled to 60° C. to give a butylacrylate-styrene copolymer latex having double core layered structure in which the inner core is uniformly covered with butylacrylate. The average particle diameter of butylacrylate-styrene latex is 0.16 μm, the gel content is 93% by weight, and the solid content is 43% by weight.

(2) Step 2: Preparation of Acrylate-Vinyl Aromatic-Unsaturated Nitrile Graft Copolymer To 50 parts by weight (based on solid content) of the double core layered butylacrylate-styrene copolymer latex obtained in above step 1, 130 parts by weight of ion-exchanged water, 0.7 parts by weight of potassium rosinate and 0.4 parts by weight of potassium persulfate are added. The temperature is raised to 60° C. with stirring. After 10 minutes from the time of reaching 60° C., a mixture comprising 33.5 parts by weight of styrene, 16.5 parts by weight of acrylonitrile and 0.03 parts by weight of dodecyl mercaptan is added to the reactor continuously over a period of 3 hours to conduct the polymerization reaction. The polymerization temperature is controlled from 60° C. to 75° C. for 3 hours. After completion of the addition, the polymerization reaction is continued for an additional 60 minutes while maintaining the temperature. The reaction is cooled to 65° C. to obtain a graft latex having a graft ratio of 56% and a solid content of 43% by weight. The graft latex is coagulated with an aqueous solution comprising 1% magnesium sulfate and 0.5% sulfuric acid, washed and dried to yield a graft copolymer in the form of white powder containing less than 1% water.

To 45 parts by weight of the graft copolymer, 55 parts by weight of SAN resin comprising 36% by weight of acrylonitrile and 64% by weight of styrene and having a weight average molecular weight of 115,000, 0.3 parts by weight of Irganox 1076(Ciba) as an antioxidant, 0.4 parts by weight of ethylenebis stearamide as a lubricant, 0.3 parts by weight of magnesium stearate as a stabilizer and 1 parts by weight of carbon black are added and extruded to prepare pellets. The pellets are molded into test specimens using an injection molding machine to a size of 2.2 mm×10 mm×6 mm for measuring colorability and weatherability Example 2

Example 2 is prepared in the same manner as in Example 1 except that 15 parts by weight of butylacrylate and 5 parts by weight of styrene are used for preparing inner core layer in step 1. The average particle diameter of butylacrylate-styrene latex prepared in step 1 is 0.14 μm, the gel content is 94% by weight, and the solid content is 43% by weight. The graft copolymer obtained therefrom has a graft ratio of 53% and a solid content of 42.5% by weight.

Example 3

Example 3 is prepared in the same manner as in Example 1 except that 10 parts by weight of butylacrylate and 20 parts by weight of styrene are used for preparing the inner core layer in step 1 and 70 parts by weight butylacrylate are used for preparing the outer core layer in step 1. The average particle diameter of the butylacrylate-styrene latex prepared in step 1 is 0.18 μm, the gel content is 93% by weight, and the solid content is 44% by weight. The graft copolymer obtained therefrom has a graft ratio of 58% and a solid content of 43.5% by weight.

Example 4

Example 4 is prepared in the same manner as in Example 1 except that the gel content of the butylacrylate-styrene copolymer latex prepared in the step 1 is adjusted to 85%. The average particle diameter of the rubber latex in the core layer is 0.16 μm and the solid content is 43% by weight. The graft copolymer obtained therefrom has a graft ratio of 49% and a solid content of 43% by weight.

Example 5

Example 5 is prepared in the same manner as in Example 1 except that the average particle diameter of the butylacrylate-styrene latex prepared in step 1 is adjusted to 0.12 μm. The graft copolymer obtained therefrom has a graft ratio of 64% and a solid content of 43.5% by weight.

Example 6

Example 6 is prepared in the same manner as in Example 1 except that the average particle diameter of the butylacrylate-styrene latex prepared in step 1 is adjusted to 0.26 μm. The graft copolymer obtained therefrom has a graft ratio of 57% and a solid content of 42% by weight.

Example 7

Example 7 is prepared in the same manner as in Example 1 except that the amount of styrene in step 2 is changed to 36.5 parts by weight, and the amount of acrylonitrile in step 2 is changed to 13.5 parts by weight. The graft copolymer obtained therefrom has a graft ratio of 53% and a solid content of 42% by weight.

Example 8

Example 8 is prepared in the same manner as in Example 1 except that the amount of styrene in step 2 is changed to 32.0 parts by weight, and the amount of acrylonitrile in step 2 is changed to 18.0 parts by weight. The graft copolymer obtained therefrom has a graft ratio of 60% and a solid content of 43% by weight.

Example 9

Example 9 is prepared in the same manner as in Example 1 except that the amount of the butylacrylate-styrene copolymer latex prepared from step 1 is changed to 60 parts by weight (based on solid content), the amount of styrene in step 2 is changed to 26.8 parts by weight, and the amount of acrylonitrile in step 2 is changed to 13.2 parts by weight. The graft copolymer obtained therefrom has a graft ratio of 55% and a solid content of 42% by weight.

Example 10

Example 10 is prepared in the same manner as in Example 1 except that the graft ratio is adjusted to 35% in step 2.

Example 11

Example 11 is prepared in the same manner as in Example 1 except that the graft ratio is adjusted to 65% in step 2.

Example 12

Example 12 is prepared in the same manner as in Example 1 except that 55 parts by weight of SAN resin comprising 30% by weight of acrylonitrile and 70% by weight of styrene is extruded with 45 parts by weight of the graft copolymer obtained from step 2.

Example 13

Example 13 is prepared in the same manner as in Example 1 except that 55 parts by weight of SAN resin comprising 40% by weight of acrylonitrile and 60% by weight of styrene is extruded with 45 parts by weight of the graft copolymer obtained from step 2.

Comparative Example 1

Comparative Example 1 is prepared in the same manner as in Example 1 except that 20 parts by weight of butylacrylate is used to prepare the inner core layer in step 1, and 20 parts by weight of styrene and 60 parts by weight butylacrylate are used to prepare the outer core layer in step 1. The average particle diameter of the butylacrylate-styrene latex prepared in step 1 is 0.17 μm, the gel content is 93% by weight, and the solid content is 43% by weight. The graft copolymer obtained therefrom has a graft ratio of 58%.

Comparative Example 2

Comparative Example 2 is prepared in the same manner as in Example 1 except that 10 parts by weight of butylacrylate and 10 parts by weight of styrene are used to prepare the inner core layer in step 1 and 10 parts by weight of styrene and 70 parts by weight butylacrylate are used to prepare the outer core layer in step 1. The average particle diameter of the butylacrylate-styrene latex prepared in step 1 is 0.14 μm, the gel content is 92% by weight, and the solid content is 43% by weight. The graft copolymer obtained therefrom has a graft ratio of 55%.

Comparative Example 3

Comparative Example 3 is prepared in the same manner as in Example 1 except that 20 parts by weight of butylacrylate is used to prepare the inner core layer in step 1, and 80 parts by weight butylacrylate is used to prepare the outer core layer in step 1. The average particle diameter of the latex prepared in step 1 is 0.21 μm, the gel content is 91% by weight, and the solid content is 42% by weight. The graft copolymer obtained therefrom has a graft ratio of 54%.

Comparative Example 4

Comparative Example 4 is prepared in the same manner as in Comparative Example 3 except that the amount of styrene in step 2 is changed to 37.5 parts by weight, and the amount of acrylonitrile in step 2 is changed to 12.5 parts by weight. The graft copolymer obtained therefrom has a graft ratio of 48%.

Comparative Example 5

Comparative Example 5 is prepared in the same manner as in Example 1 except that 20 parts by weight of polybutadiene rubber having an average diameter of 0.25 μm and a gel content of 82% by weight is used as a seed for the inner core in step 1, and 80 parts by weight butylacrylate is used to prepare the outer core layer in step 1. The average particle diameter of the rubber latex prepared in step 1 is 0.30 μm, the gel content is 89% by weight, and the solid content is 43% by weight. The graft copolymer obtained therefrom has a graft ratio of 62%.

Comparative Example 6

Comparative Example 6 is prepared in the same manner as in Comparative Example 3 except that 55 parts by weight of SAN resin comprising 20% by weight of acrylonitrile and 80% by weight of styrene is extruded with 45 parts by weight of the graft copolymer obtained from step 2.

The resultant graft copolymer lattices obtained from Examples 1 to 13 and Comparative Examples 1 to 6 are coagulated by isopropyl alcohol, dehydrated and dried to obtain white powder. The powder is dissolved with acetone followed by centrifugal separation. Insoluble portions are washed and dried, and the weight is measured. The graft ratio is obtained by the following equation:

$$\text{Graft ratio} = \frac{\text{Weight of the insoluble portion} - \text{Weight of rubber}}{\text{Weight of rubber (solid content)}} \times 100$$

(1) Notch Izod Impact Strength (kg·cm/cm): The notch Izod impact strength is measured in accordance with ASTM D256 (1/8" notched) at −30° C. and at 23° C. respectively.
(2) Gloss (%): The gloss is measured at an angle of 60° C. in accordance with ASTM D523.
(3) Melt Flow Index: The melt flow index is measured in accordance with ISO 1133(g/10 min, 220° C., 10 kg).
(4) Colorability: The values of ΔL and Δb are measured by means of a spectrophotometer. The standard is the ASA resin obtained from Comparative Example 3. If ΔL is negative, this means that the sample is lighter than the standard. Δb defines the difference as a blue/yellow value. If Δb is negative, the sample is more blue, which means good colorability.
(5) Weatherability: The weatherability is measured in accordance with ASTM G155. The results are shown in Tables 1 and 2.

TABLE 1

| | Examples | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Notch Izod impact strength (23° C.) | 41 | 43 | 36 | 45 | 37 | 47 | 44 | 41 | 42 | 45 | 41 | 48 | 38 |
| Notch Izod impact strength (−30° C.) | 8 | 9 | 7 | 10 | 7 | 11 | 10 | 9 | 9 | 7 | 10 | 10 | 8 |
| gloss(60° C.) | 93 | 92 | 95 | 89 | 94 | 90 | 92 | 94 | 92 | 90 | 92 | 92 | 95 |
| melt flow index | 14 | 14 | 15 | 16 | 13 | 15 | 15 | 13 | 12 | 16 | 13 | 15 | 11 |
| colorability | □ | ○ | □ | □ | □ | ○ | ○ | □ | □ | ○ | □ | □ | □ |
| delta L | −2.01 | −1.72 | −2.29 | −1.99 | −2.18 | −1.77 | −1.69 | −2.11 | −2.03 | −1.69 | −1.84 | −1.92 | −2.15 |
| delta b | −1.18 | −0.78 | −1.21 | −0.98 | −1.20 | −0.81 | −0.65 | −1.09 | −1.15 | −0.72 | −0.87 | −0.94 | −1.22 |
| Weatherability (2500 hours, ΔE) | 1.3 | 1.3 | 1.4 | 1.4 | 1.2 | 1.3 | 1.5 | 1.1 | 1.4 | 1.4 | 1.6 | 1.7 | 1.1 |

TABLE 2

| | Comparative Example | | | | | |
|---|---|---|---|---|---|---|
| | 1 | 2 | 3 | 4 | 5 | 6 |
| Notch Izod Impact strength(23° C.) | 41 | 39 | 44 | 40 | 51 | 36 |
| Notch Izod Impact strength(−30° C.) | 4 | 4 | 8 | 7 | 9 | 4 |
| Gloss(60° C.) | 93 | 93 | 89 | 88 | 90 | 88 |
| melt flow index | 14 | 15 | 14 | 14 | 15 | 16 |
| colorability | □ | □ | x | x | □ | xx |
| delta L | −0.89 | −1.98 | 0.0 | 0.12 | −0.11 | 0.22 |
| delta b | −0.37 | −0.99 | 0.0 | 0.08 | −0.03 | 0.19 |
| Weatherability (2500 hours, ΔE) | 2.1 | 1.9 | 1.5 | 2.1 | 3.9 | 2.3 |

As shown in Tables 1 and 2, the Examples of the invention including an inner core of butylacrylate-styrene copolymer exhibit excellent impact resistance at room temperature and at low temperatures, colorability and weatherability as compared to the Comparative Examples. Comparative Example 5 whose core is butadiene-butylacrylate rubber shows that the weatherability was remarkably deteriorated. Comparative Example 1 in which styrene monomer is copolymerized with butylacrylate in the outer core and Comparative Example 2 in which styrene monomer is copolymerized with butylacrylate in both the inner and the outer core shows poor low temperature impact resistance.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A thermoplastic resin composition comprising:
   about 40 to about 70 parts by weight of a (meth)acrylate-vinyl aromatic-unsaturated nitrile graft copolymer comprising a double layered rubbery polymer comprising an inner core layer comprising an alkyl(meth)acrylate-vinyl aromatic copolymer and an outer core layer comprising an alkyl(meth)acrylate polymer, wherein the alkyl(meth)acrylate of the alkyl(meth)acrylate-vinyl aromatic copolymer of the inner core layer is n-butyl acrylate, n-butyl methacrylate, or a mixture thereof; and a vinyl aromatic-unsaturated nitrile copolymer shell layer grafted onto said double layered rubbery polymer; and
   about 30 to about 60 parts by weight of a vinyl aromatic-unsaturated nitrile copolymer, wherein said (meth)acrylate-vinyl aromatic-unsaturated nitrile graft copolymer has a graft ratio of about 30 to about 70%.

2. The thermoplastic composition of claim 1, wherein said rubbery polymer has an average particle size of about 0.1 to about 0.3 μm, a gel content of about 85 to about 98% and a swell index of about 10 to about 25.

3. The thermoplastic composition of claim 1, wherein said alkyl(meth)acrylate-vinyl aromatic copolymer of the inner core layer is a copolymer of about 20 to about 80% by weight of said alkyl(meth)acrylate compound and about 80 to about 20% by weight of said vinyl aromatic compound.

4. The thermoplastic composition of claim 1, wherein said double layered rubbery polymer comprises about 10 to about 50% by weight of said inner core layer and about 90 to about 50% by weight of said outer core layer.

5. The thermoplastic composition of claim 1, wherein said (meth)acrylate-vinyl aromatic-unsaturated nitrile graft copolymer comprises about 40 to about 70 parts by weight of said double layered rubbery polymer and about 30 to about 60 parts by weight of said shell layer.

6. The thermoplastic composition of claim 1, wherein said shell layer comprises a copolymer comprising about 62 to about 80% by weight of a vinyl aromatic compound and about 38 to about 20% by weight of an unsaturated nitrile compound.

7. The thermoplastic resin composition of claim 1, wherein said vinyl aromatic-unsaturated nitrile copolymer comprises about 23 to about 45% by weight of an unsaturated nitrile compound and about 77 to about 55% by weight of a vinyl aromatic compound.

8. The thermoplastic composition of claim 1, wherein said alkyl(meth)acrylate-vinyl aromatic copolymer of the inner core layer is a copolymer of 20 to 50% by weight of said alkyl(meth)acrylate compound and 80 to 50% by weight of said vinyl aromatic compound.

* * * * *